United States Patent [19]

Nelson, Jr. et al.

[11] Patent Number: 4,613,340

[45] Date of Patent: * Sep. 23, 1986

[54] RESIDUAL OIL SLUDGE DISPERSANT

[75] Inventors: Otis L. Nelson, Jr.; Mark L. Nelson, both of Bay City, Mich.

[73] Assignee: Polar Molecular Corp., Saginaw, Mich.

[*] Notice: The portion of the term of this patent subsequent to May 14, 2002 has been disclaimed.

[21] Appl. No.: 732,574

[22] Filed: May 10, 1985

Related U.S. Application Data

[63] Continuation of Ser. No. 569,160, Jan. 9, 1984, Pat. No. 4,516,981.

[51] Int. Cl.$^4$ .............................................. C10L 1/02
[52] U.S. Cl. .......................................... 44/53; 44/51; 44/77; 252/351
[58] Field of Search ........................ 44/53, 51, 77, 78; 585/14; 252/351, DIG. I; 210/925

[56] References Cited

U.S. PATENT DOCUMENTS

| | | | |
|---|---|---|---|
| 2,170,644 | 8/1939 | Nelson | 252/351 |
| 3,282,843 | 11/1966 | Olburger | 252/351 |
| 3,577,340 | 5/1971 | Paviak et al. | 252/351 |
| 3,917,537 | 11/1975 | Elsdon | 44/58 |

*Primary Examiner*—William R. Dixon, Jr.
*Assistant Examiner*—Margaret B. Medley
*Attorney, Agent, or Firm*—Lackenbach Siegel Marzullo Presta & Aronson

[57] ABSTRACT

A non-ionic composition for dispersing sludge and causing rapid separation of water for easy removal, in residual oils, is formed from a blend of n-hexanol, diethylene glycol methyl ether and isooctyl phenyl polyethoxy ethanol. The dispersant, when used in 1:1,000–4,000 parts of dispersant to parts of oil, causes dispersion of the sludge and eliminates the need for physically removing the sludge.

3 Claims, No Drawings

RESIDUAL OIL SLUDGE DISPERSANT

This is a continuation of application Ser. No. 569,160, filed Jan. 9, 1984, now U.S. Pat. No. 4,516,981.

FIELD OF THE INVENTION

This invention relates to a sludge dispersant. More specifically, this invention relates to a sludge dispersant for residual fuel oils.

BACKGROUND AND DISCUSSION OF THE PRIOR ART

Heavy residual oils such as no. 6 residual are stored in large holding tanks. Often such oils contain portions of tars, carbon, and exceptionally heavy portions which eventually settle out in storage. With accumulation of the settled sludge, the storage tank has to be taken out of service and cleaned, with concomitant loss of time and fuel.

Another storage problem is water condensation and accumulation, which can lead to bacteria formation and fuel deterioration, as well as freezing, depending upon the ambient environment.

Prior art attempts have been directed to solving certain of these problems, with only limited success.

Now there is provided by the present invention a dispersant which disperses the sludge and causes rapid settling out of dispersed water for easy removal.

SUMMARY OF THE INVENTION

A non-ionic dispersant which disperses sludge and precipitates unwanted water in residual oils formed of a blend of an alcohol such as hexanol, glycol alkyl ether, and a polyethoxylated compound.

DESCRIPTION OF THE PREFERRED EMBODIMENTS

Broadly speaking, the composition of the present invention is as follows:

| Component | Weight Percent Preferred | Useful |
|---|---|---|
| hexanol | 20–30 | 10–50 |
| glycol ether | 10–20 | 5–50 |
| polyethoxylated compound | 50–75 | 25–80 |

The hexanol may be a mixture of the hexanol isomers or may be n-hexanol, neat. Other low molecular weight alkyl alcohols may be somewhat useful, but hexanol is most preferred.

Suitable glycol ethers include glycol alkyl ethers, particularly dimethylene glycol methyl ether, ethylene glycol ethyl ether, tri-ethylene glycol methyl ether, and the like. Dimethylene glycol methyl ether is most preferred.

Suitable polyethoxylated compounds useful in the present invention are aryl polyethoxylated compounds, and specifically the alkyl aryl polyethoxylated compounds, and more specifically the alcohol forms thereof. Suitable alkyl components are $C_2$–$C_{10}$, and suitable aryl components include benzyl, phenyl, naphthyl and the like. Isooctyl phenyl polyethoxy ethanol is most preferred.

The following examples are illustrative of the invention:

| Component | Weight % |
|---|---|
| hexanol[1] | 25 |
| diethylene glycol methyl ether | 15 |
| isooctyl phenyl polyethoxy ethanol[2] | 60 |

[1] EPAL 6 (Ethyl Corp., Baton Rouge, La.)
[2] TRITON X-100 (Rohm & Haas, Philadelphia, Pa.)

Hexanol and glycol ether are mixed at room temperature for about 5 minutes. The polyethoxy ether is then added at room temperature and mixed for 15–20 minutes.

When the aforesaid composition is added in 1:1,000 to 4,000 parts of dispersant to parts of oil, the sludge is readily dispersed.

A sludge of no. 6 heavy oil containing 30% seawater was divided in three equal aliquot portions, designated samples no. 1–3. Sample 1 was blank, that is, no additive added. Sample 2 was provided with 1 part of diethylene glycol methyl ether to 1,000 parts of the sample. Sample 3 contained 1 part of the aforesaid sludge dispersant of the present invention to 1,000 parts of the sample. All samples were heated to 170° F. and allowed to sit for 21 hours.

The only sample which gave the desired results of dispersing sludge and precipitating water for easy removal was sample 3, which is the invention.

We claim:

1. A residual oil sludge dispersant comprising a low molecular weight alkyl alcohol; a glycol ether; and a polyethoxylated compound, said alcohol present in an amount of 10–50 percent by weight, said glycol ether comprising a glycol alkyl monoether present in an amount of 5–50 percent by weight, and said ethoxylated compound being present in an amount of 25–80 percent by weight.

2. The dispersant of claim 1 wherein the dispersant is present in an amount of one part of dispersant to from 1,000 to 4,000 parts of residual oil.

3. In combination;
a residual oil having sludge and water;
and a dispersant in an amount of 1 part of dispersant to 1,000–4,000 parts of oil consisting essentially of a low molecular weight alcohol in an amount of 10–50 percent by weight, a glycol ether in an amount of 5–50 percent by weight, and a polyethoxylated compound in an amount of 25–80 percent by weight, wherein the dispersant disperses sludge and precipitates out water from the residual oil.

* * * * *